United States Patent
Zhang et al.

(10) Patent No.: US 10,992,930 B2
(45) Date of Patent: Apr. 27, 2021

(54) TEMPLATE REFINED BI-PREDICTION FOR VIDEO CODING

(71) Applicant: HULU, LLC, Santa Monica, CA (US)

(72) Inventors: Wenhao Zhang, Beijing (CN); Deliang Fu, Beijing (CN); Min Gao, Beijing (CN); Juncheng Ma, Beijing (CN); Chen Liu, Beijing (CN)

(73) Assignee: HULU, LLC, Santa Monica, CA (US)

( * ) Notice: Subject to any disclaimer, the term of this patent is extended or adjusted under 35 U.S.C. 154(b) by 24 days.

(21) Appl. No.: 16/370,322

(22) Filed: Mar. 29, 2019

(65) Prior Publication Data
US 2019/0306495 A1    Oct. 3, 2019

Related U.S. Application Data
(60) Provisional application No. 62/650,871, filed on Mar. 30, 2018.

(51) Int. Cl.
*H04N 19/105* (2014.01)
*H04N 19/577* (2014.01)
*H04N 19/159* (2014.01)
*H04N 19/176* (2014.01)

(52) U.S. Cl.
CPC ......... *H04N 19/105* (2014.11); *H04N 19/159* (2014.11); *H04N 19/176* (2014.11); *H04N 19/577* (2014.11)

(58) Field of Classification Search
CPC ... H04N 19/176; H04N 19/105; H04N 19/577
See application file for complete search history.

(56) References Cited

U.S. PATENT DOCUMENTS

| | | | |
|---|---|---|---|
| 2011/0002387 A1 | 1/2011 | Chiu et al. | |
| 2011/0002388 A1 | 1/2011 | Karczewicz et al. | |
| 2011/0261882 A1* | 10/2011 | Zheng | H04N 19/105 375/240.13 |
| 2014/0327819 A1 | 11/2014 | Wu et al. | |
| 2018/0077424 A1 | 3/2018 | Lin et al. | |
| 2018/0241998 A1* | 8/2018 | Chen | H04N 19/105 |
| 2018/0249154 A1* | 8/2018 | Chuang | H04N 19/52 |

(Continued)

FOREIGN PATENT DOCUMENTS

| | | | | |
|---|---|---|---|---|
| KR | 10-2015-0090454 A | 8/2015 | | |
| WO | WO-2019072373 A1 * | 4/2019 | | H04N 19/513 |

OTHER PUBLICATIONS

International Search Report & Written Opinion for PCT Application PCT/US2019/025046 dated Jul. 18, 2019, 11 pages.

(Continued)

*Primary Examiner* — Rebecca A Volentine
(74) *Attorney, Agent, or Firm* — Fountainhead Law Group P.C.

(57) ABSTRACT

In one embodiment, a method selects a first reference block in a first reference frame and a second reference block in a second reference frame. The first reference block and the second reference block are used to predict a current block. The first reference block is selected as an anchor point. Then, the method searches in the second reference frame for a third reference block and determines whether the third reference block is a better reference block than the second reference block for predicting the current block.

20 Claims, 8 Drawing Sheets

(56) References Cited

U.S. PATENT DOCUMENTS

2018/0316918 A1\* 11/2018 Drugeon .............. H04N 19/117
2019/0007699 A1\* 1/2019 Liu ...................... H04N 19/139
2019/0124350 A1\* 4/2019 Thirumalai .......... H04N 19/513

OTHER PUBLICATIONS

Bross et al.: "Versatile Video Coding (Draft 4)"; Joint Video Experts Team (JVET) of ITU-T SG 16 WP 3 and ISO/IEC JTC 1/SC 29/WG 11; 13th Meeting: Marrakech, MA, Jan. 9-18, 2019; 248 pages.

\* cited by examiner

TEMPLATE REFINED BI-PREDICTION FOR VIDEO CODING

CROSS REFERENCE TO RELATED APPLICATIONS

Pursuant to 35 U.S.C. § 119(e), this application is entitled to and claims the benefit of the filing date of U.S. Provisional App. No. 62/650,871 filed Mar. 30, 2018, the content of which is incorporated herein by reference in its entirety for all purposes.

BACKGROUND

Inter prediction, such as inter bi-prediction, is used in video coding frameworks. Given a bi-predicted current block being decoded, a decoder copies two inter predicted reference blocks from two reference frames and blends the reference blocks together to generate a prediction block for the current block being decoded. The reference blocks are selected using a motion search that is based on a linear motion trajectory assumption, which assumes that a pixel maintains a linear path along a direction. The motion search performs one search in one linear direction for a first reference block and a second search in a second linear direction for a second reference block. The search assumes the pixel is maintaining a linear path. However, there are certain instances where the pixel will not maintain this linear path and one of the selected reference blocks will not be a good prediction of the current block. Thus, combining the two linear uni-direction motion selected reference blocks may be sub-optimal. Reasons that a pixel will not maintain the path include illumination variation among the video frames, which may be caused by the light changes during video capture or fade-in-fade-out effects during video mastering.

DETAILED DESCRIPTION

Described herein are techniques for a video coding system. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

Some embodiments include a transcoder side or decoder side process that refines the motion vectors that are used in the coding process. The process may use solely a transcoder side process, solely a decoder side process, or a combination of both a transcoder side and a decoder side.

The transcoder side may first determine motion vectors for a current block in a frame, which point to reference blocks in other frames. The transcoder may then search for reference blocks that may be a better prediction for the current block. If the transcoder determines one or more different reference blocks, the transcoder may perform different processes to signal the use of different reference blocks to the decoder. For example, the transcoder may signal the motion vectors for the different reference blocks and not include the motion vectors for the original reference blocks, if replaced, in the encoded bitstream. In other embodiments, the transcoder may only signal that different reference blocks should be used and the decoder determines the position of the different reference blocks using the decoder side process described below. In some embodiments, the transcoder may insert a value for a flag that indicates whether the decoder should perform the search or not. The transcoder can insert a bit value flag, e.g., a decoder_motion_derive_flag, for each inter coded block in the encoded bitstream. If the flag is a first value (e.g., 0), the decoder will use the motion vectors in the encoded bitstream, and if the flag is a second value (e.g., 1), the decoder will adaptively search for different motion vectors.

A decoder may use client computational power to search for new motion vectors at the video decoder side. For example, if the transcoder did not perform a search for different reference blocks, then the decoder could perform that search. However, even if the transcoder performed the search for different reference blocks, the decoder may also perform the search again. In some embodiments, the decoder may perform the search if a flag is set by the transcoder to a value that indicates the decoder should perform the search. However, the decoder may always perform the search or make the determination on its own.

The search may be a template search or bilateral search, or in some embodiments, the template search and the bilateral search are combined. The search can be used to predict some or all of the inter bi-prediction blocks, which results in better prediction of pixels. In the process, after the reference blocks are obtained, the distances between the template of the current block being decoded and the reference blocks' templates are compared to determine which reference block may be a better reference. The determination of which is a better reference may be based on a measurement, such as the reference block that is the closest to the current block may be more reliable as a reference (e.g., the closer the reference block to the current block may indicate the reference block include more similar content to the current block). Then, the process performs a bilateral search on both reference frames to refine the motion vectors. After several iterations, the two reference blocks are expected to converge to the optimal positions, and as a result, the accuracy of bi-prediction will be improved, and higher overall video compression performance can be obtained, which saves bandwidth in video transmission. The decoder side process requires using decoder computation resources to enhance video compression, but the client may have client side computing resources that are available to use with this process.

System Overview

Figure 1:
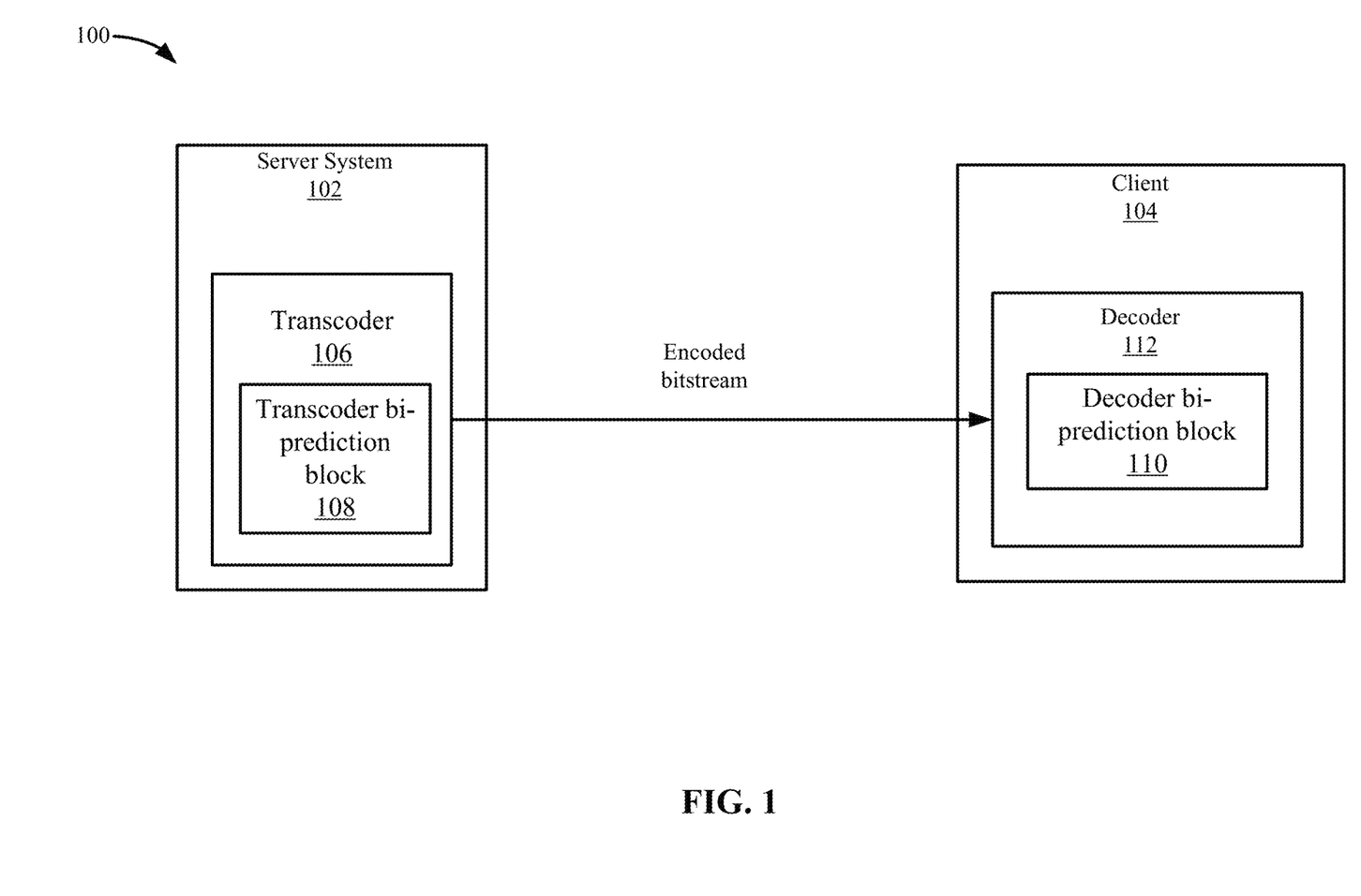
FIG. 1 depicts a simplified system for using weighted bi-prediction according to some embodiments.

FIG. 1 depicts a simplified system 100 for using weighted bi-prediction according to some embodiments. System 100 transcodes a source video asset, which may be any type of video, such as for a television show, movie, or video clip. The source video may need to be transcoded into one or more formats, such as one or more bitrates. In some embodiments, a server system 102 sends an encoded bitstream to client 104. For example, server system 102 may be sending a video to a client 104 for playback.

Server system 102 includes a transcoder 106 that transcodes a video into an encoded bitstream. Transcoder 106 may be a software video processor/transcoder configured on a central processing unit (CPU), a hardware accelerated video processor/transcoder with a graphical processing unit (GPU), a field programmable gate array (FPGA), and/or a hardware processor/transcoder implemented in an application-specific integrated circuit (ASIC). Transcoding may be the conversion from one digital format to another digital format. Transcoding may involve decoding the source format and encoding the source video into another digital format, or converting the source content into videos with a specific resolution, framerate, bitrate, codec, etc. Also, encoding may be the conversion of analog source content and to a digital format. As used, the term transcoding may include encoding.

During the transcoding process, a transcoder bi-prediction block 108 performs bi-prediction for a current block of a current frame. Inter-prediction uses reference blocks from frames other than the current frame. Bi-prediction uses a first reference block from a first frame and a second reference block from a second frame. In some embodiments, the first frame is before the current frame and the second frame is after the current frame; however, the first frame and the second frame may be both before the current frame or both after the current frame.

Transcoder bi-prediction block 108 identifies a first reference block in a first reference frame and a second reference block in a second reference frame using a motion search process. After identifying the first reference block and the second reference block, transcoder bi-prediction block 108 determines signaling values for the bi-prediction mode. The signaling values may be the values for a first motion vector that points from the current block to the first reference block and a second motion vector that points from the current block to the second reference block. Also, transcoder bi-prediction block 108 inserts a flag that indicates the bi-prediction mode should be used in the decoding process. Transcoder bi-prediction block 108 inserts these signaling values into the encoded bitstream.

As discussed above, transcoder bi-prediction block 108 may refine the values of the motion vectors and signal the refined values to a decoder 112 in client 104. Conversely, client 104 includes a decoder 112 that decodes the encoded bitstream. During the decoding process, a decoder bi-prediction block 110 may refine the values of the motion vectors to select different reference blocks. Transcoder bi-prediction block 108 may insert a value for a flag that indicates whether decoder 112 should adaptively search for new motion vectors.

Refinement Process

Figure 2:
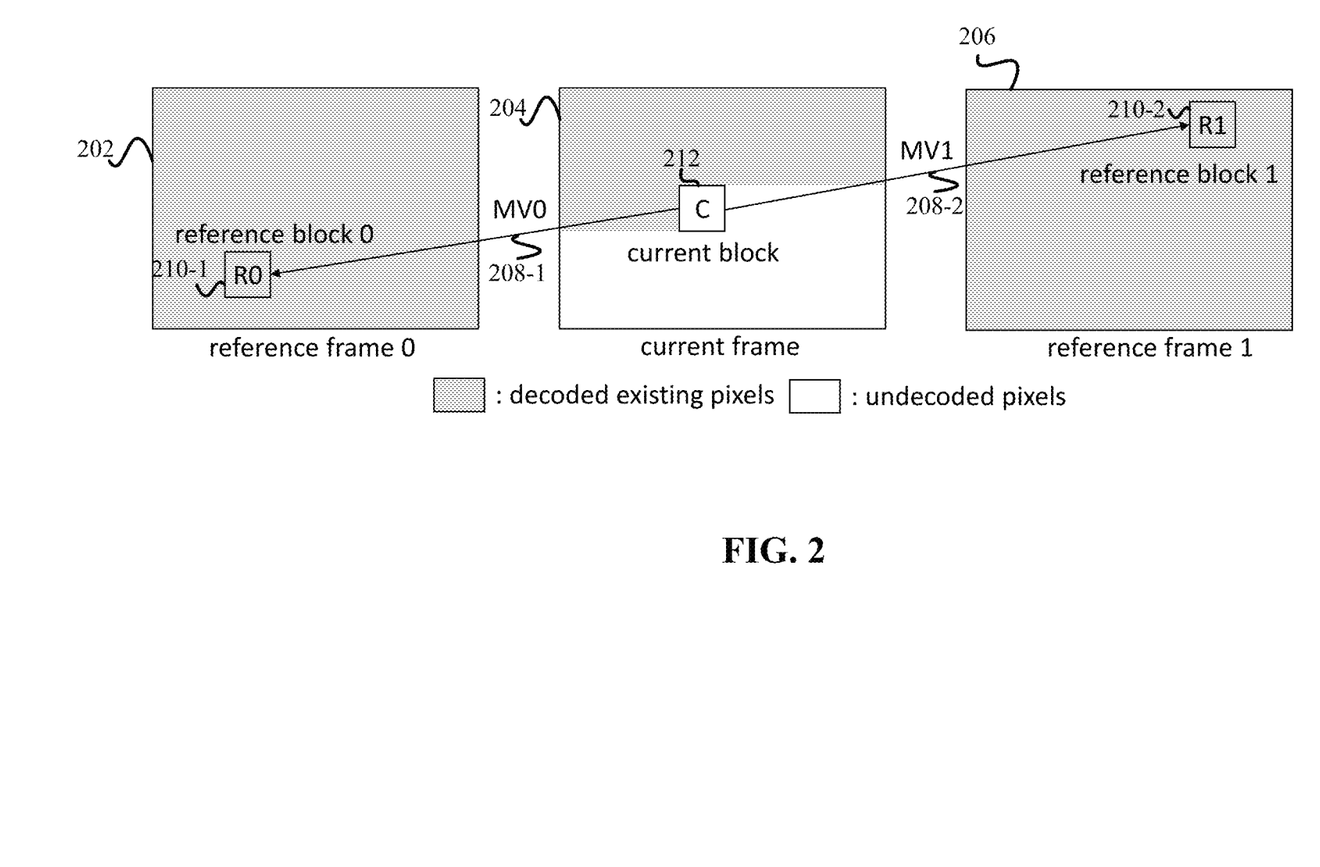
FIG. 2 shows an example of using template refined bi-prediction according to some embodiments.

FIG. 2 shows an example of using template refined bi-prediction according to some embodiments. Transcoder 106 transcodes a current frame 204. In the transcoding process, transcoder 106 decodes previously transcoded frames to use in the transcoding process of other frames. Here, transcoder 106 has already transcoded and then decoded reference frame 202 (reference frame 0) and reference frame 206 (reference frame 1). Transcoder 106 selects motion vectors (MV) to reference the positions of the reference blocks that are used to predict the current block C. Transcoder 106 may use various motion search methods to select the motion vectors for the reference blocks. Then, transcoder 106 may insert the motion vectors to use in the encoded bitstream along with a flag with a value that indicates whether or not to use template refined bi-prediction on the decoder side.

Decoder 112 receives the encoded bitstream and starts decoding frames. Using the example in FIG. 2, decoder 112 is decoding a current frame 204. Decoder 112 has already decoded reference frame 202 (reference frame 0) and reference frame 206 (reference frame 1). Decoder 112 uses motion vectors to select the positions of the reference blocks that are used to predict the current block C. For example, transcoder 106 may have encoded the motion vectors for the current block in the encoded bitstream. A motion vector MV0 208-1 points to a reference block R0 210-1 in reference frame 0 and a motion vector MV1 208-2 points to a reference block R1 210-2 in reference frame 1. Decoder 112 generates a prediction block from reference block R0 and reference block R1, and applies the residual to the prediction block to decode the current block.

Transcoder 106 or decoder 112 uses the pixels of reference block R0 and reference block R1 to predict the pixels of current block C 212. For example, an average blending pixel by pixel is used of:

$$C_{i,j} = \frac{1}{2}R0_{i,j} + \frac{1}{2}R1_{i,j}.$$

where C is the pixels of the current block, R0 is the pixels of the reference block R0, and R1 is the pixels of reference block R1. The values of "½" in the equation weight the pixels of reference block R0 and reference block R1 equally. Accordingly, the pixels of reference block R0 and reference block R1 are given equal weight to predict the pixels of current block C.

In some embodiments, transcoder 106 may use a motion search that is based on a linear motion trajectory assumption, which searches in separate linear directions to select reference blocks in reference frames. However, combining two linear uni-direction motion predictions into a bi-motion prediction may be sub-optimal. In some embodiments, transcoder 106 or decoder 112 may refine the motion vectors to improve the motion prediction.

Figure 3:
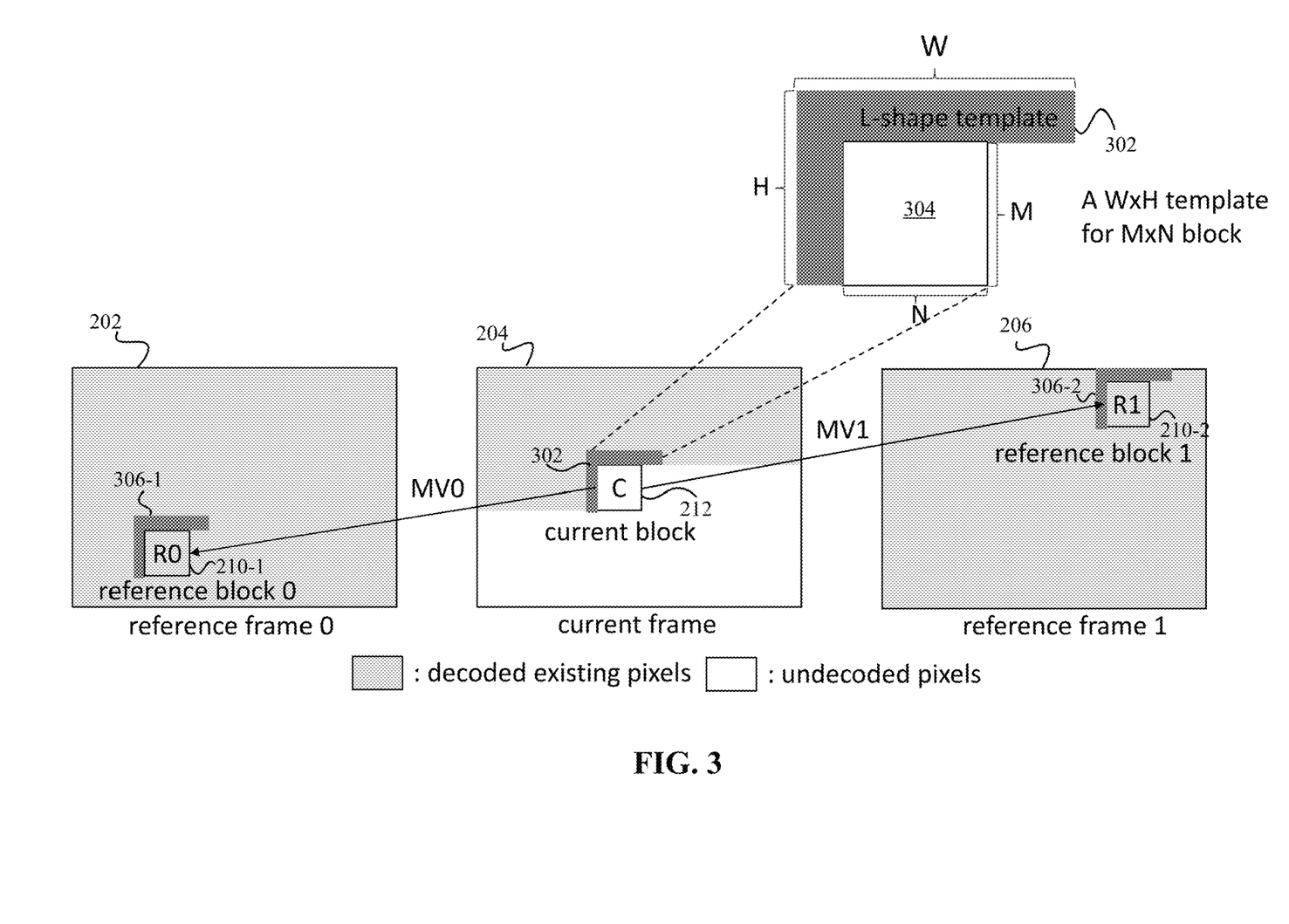
FIG. 3 depicts an example of a template that is used for transcoder or decoder side motion prediction refinement according to some embodiments.

FIG. 3 depicts an example of a template 302 that is used for transcoder or decoder side motion prediction refinement according to some embodiments. Transcoder 106 or decoder 112 has decoded some blocks in current frame 204 that are represented with shading and has not decoded some blocks without shading. Transcoder 106 or decoder 112 has already decoded reference frame 202 (reference frame 0) and reference frame 206 (reference frame 1). Transcoder 106 or decoder 112 determines a shape, such as a L shape of decoded existing pixels at 302. The L shaped region is a template of a width W and a height H. The L shaped region may be neighboring pixels to a current block 212 of M×N size being decoded. Although an L shaped region is described, other types of shapes may be used, such as the width of the template may not go beyond the top side of the current block.

Transcoder 106 or decoder 112 identifies a template 306-1 in the reference frame 0 based on reference block 0 and a template 306-2 in the reference frame 1 based on reference block 1. Template 306-1 and template 306-2 may have the same dimensions as template 302, such as the W×H dimensions. Also, template 306-1 and template 306-2 may also be positioned the same relative to reference blocks 0 and 1, such as forming an L-shape template next to the left and top sides of the reference blocks 0 and 1, respectively.

Transcoder 106 or decoder 112 uses template 306-1 in the reference frame 0, template 302 for the current block, and template 306-2 in the reference frame 1 to refine the motion vectors. The templates are used because current block 0 has not been decoded yet. Thus, transcoder 106 or decoder 112 uses decoded pixels in the current frame in the motion prediction refinement process.

In the process, while transcoder 106 is transcoding the video, transcoder 106 selects the reference frames and motion vectors. Or, while decoder 112 is decoding the encoded bitstream, decoder 112 determines the reference frames to use from the encoded bitstream, such as reference frame 0 and reference frame 1. Also, the encoded bitstream includes motion vectors for the current block being decoded. Transcoder 106 or decoder 112 uses the motion vectors to select the positions of the reference blocks R0 and R1. Transcoder 106 or decoder 112 then selects templates. For example, transcoder 106 or decoder 112 selects an L shaped region around the reference block R0 and R1 as the templates 306-1 and 306-2, respectively. Also, transcoder 106 or decoder 112 selects a similarly shaped template 302 for the current block.

Figure 4:
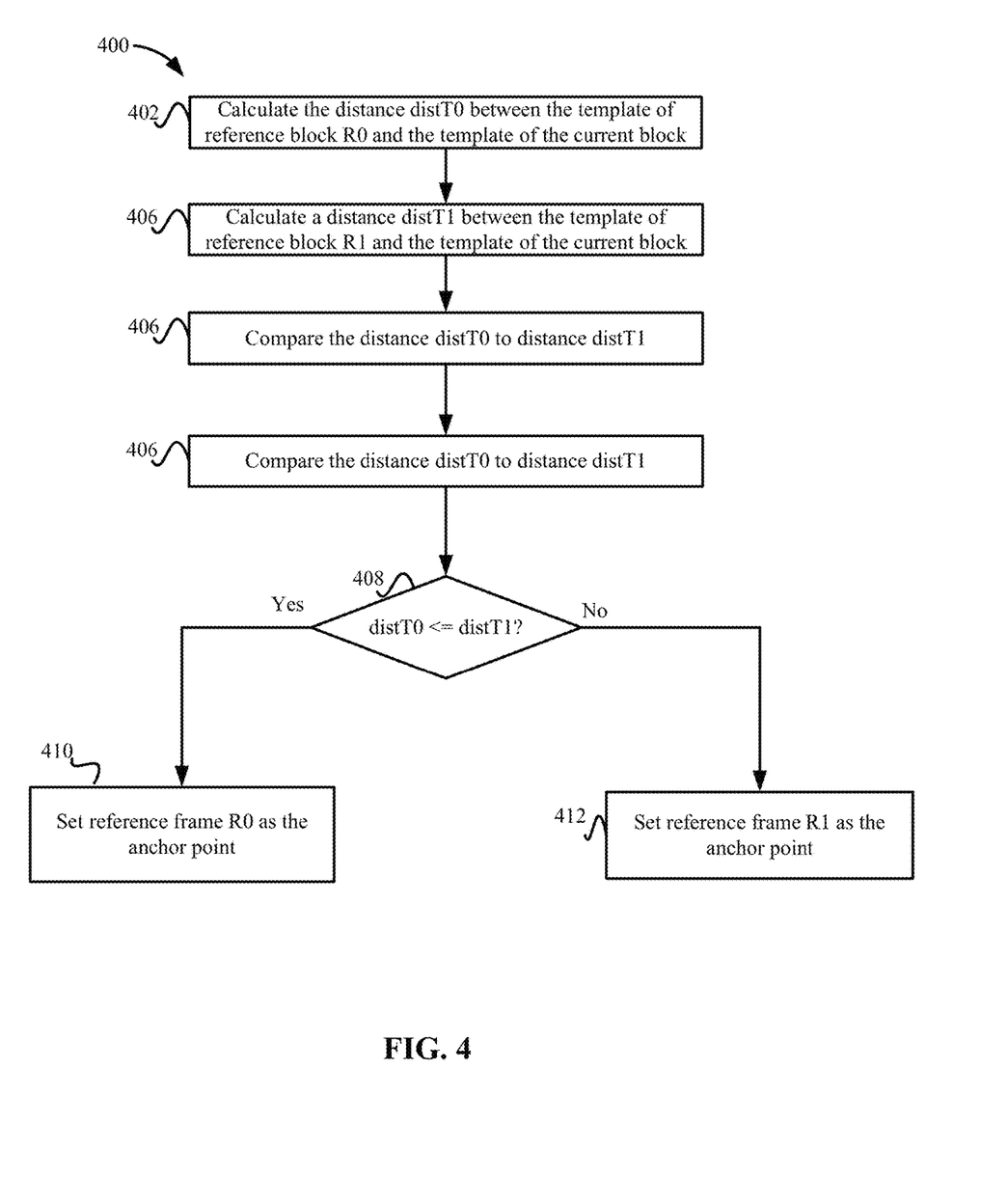
FIG. 4 depicts a simplified flowchart of a method for refining the motion prediction according to some embodiments.

Transcoder 106 or decoder 112 then uses templates 302, 306-1, and 306-2 to refine the motion prediction. For example, transcoder 106 or decoder 112 may change one of the reference blocks or both of the reference blocks. FIG. 4 depicts a simplified flowchart 400 of a method for refining the motion prediction according to some embodiments. Transcoder 106 or decoder 112 first selects an anchor point, which designates a reference block that will not change in this iteration of the process. In the process, at 402, transcoder 106 or decoder 112 calculates the distance distT0 between the template 306-1 of reference block R0 and the template 302 of the current block. Also, at 404, transcoder 106 or decoder 112 calculates a distance distT1 between template 306-2 of reference block R1 and the template 302 of the current block. The distance may be based on a characteristic of the blocks, such as a local complexity, texture similarity, color difference, temporal distance, coding parameters such as a quantization parameter (QP), block size, coding mode, etc. The comparison of characteristics may use a per-pixel distance within the templates, which can be calculated by Sum of Absolute Difference (SAD), Sum of Square Difference (SSD), or Sum of Absolute Transformed Difference (SATD). The distances distT0 and distT1 may be calculated using:

$$\text{dist}T0 = \Sigma |T_{i,j} - T0_{i,j}|, \text{dist}T1 = \Sigma |T_{i,j} - T1_{i,j}|,$$

where T is template 302, T0 is template 306-1, and T1 is template 306-2.

At 406, transcoder 106 or decoder 112 compares distance distT0 to distance distT1. At 408, if distance distT0 is less than or equal to (e.g., <=) distance distT1, then at 410, transcoder 106 or decoder 112 sets reference frame R0 as the anchor point. If not, then at 412, transcoder 106 or decoder 112 sets reference frame R1 as the anchor point. The frame that is the anchor point is not changed in this iteration. However, the frame that is not the anchor point may be changed, such as the reference block within the reference frame may be changed or the reference frame itself is changed to another reference frame.

Figure 5:
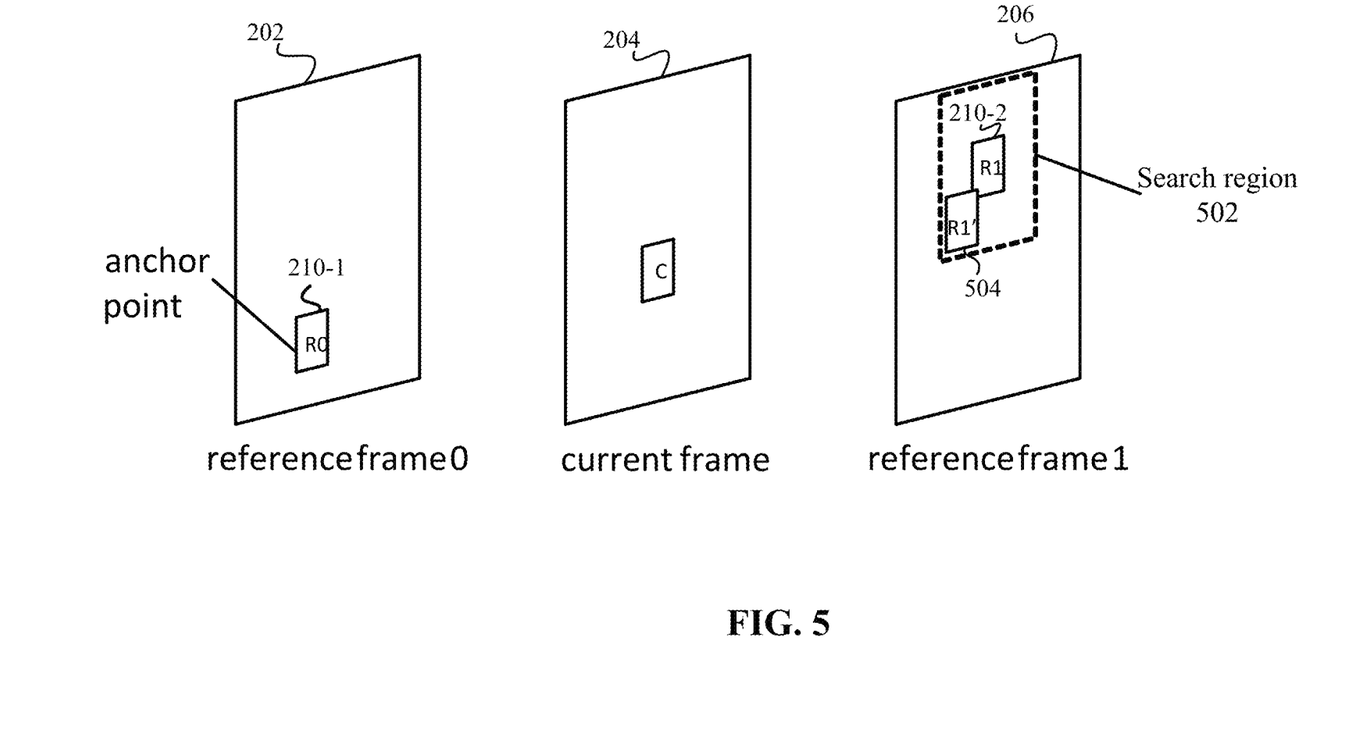
FIG. 5 depicts a search process for a new reference block according to some embodiments.

FIG. 5 depicts a search process for a new reference block according to some embodiments. Transcoder 106 or decoder 112 fixes the anchor point and then searches in another reference frame in a search region 502. Transcoder 106 or decoder 112 may perform the search in reference frame 1, or in any reference frame. For example, if the distance dist1 is above a threshold, then decoder 112 may decide to search in another reference frame. But, if the distance dist1 is below the threshold, then this may indicate the reference frame 1 may still be a good candidate for use as a reference because the distance may not be large.

If reference block R0 is the anchor point, the search attempts to find a better reference block in reference frame 1 than reference block R1. Transcoder 106 or decoder 112 refines the search in a search region centered at reference block R1 in reference frame 1. The search region may be pre-defined according to the video resolution and the strength of motion in the video. For example, for 1080p video, a search region of 64×64 centered at anchor point may be enough to capture regular motion. In some embodiments, the search attempts to find a reference block R1' at 504 that minimizes the distance distR0R1', which is a distance between reference block R0 and reference block R1'. The distance can be calculated by Sum of Absolute Difference (SAD), Sum of Square Difference (SSD), or Sum of Absolute Transformed Difference (SATD), such as by:

$$\text{dist}R0R1' = \Sigma |R0_{i,j} - R1'_{i,j}|,$$

where R0 is reference block R0 and R1 is reference block R1'. The distance distR0R1' may be smaller than the distance between reference block R0 and reference block R1, which may provide a better prediction if reference block R1' is used instead of reference block R1. Transcoder 106 or decoder 112 may calculate the distance distR0R1' using:

$$R1' = \arg\min(\text{dist}R0R1'),$$

where arg min is the minimum of the distance between reference block R0 and reference block R1'. If decoder 112 finds a reference block R1' that includes a distance smaller than the distance distR0R1 in search region 502, transcoder 106 or decoder 112 updates the reference block position to the position of reference block R1'. For example, transcoder 106 or decoder 112 updates the motion vector MV1 to point to reference block R1'.

Figure 6:
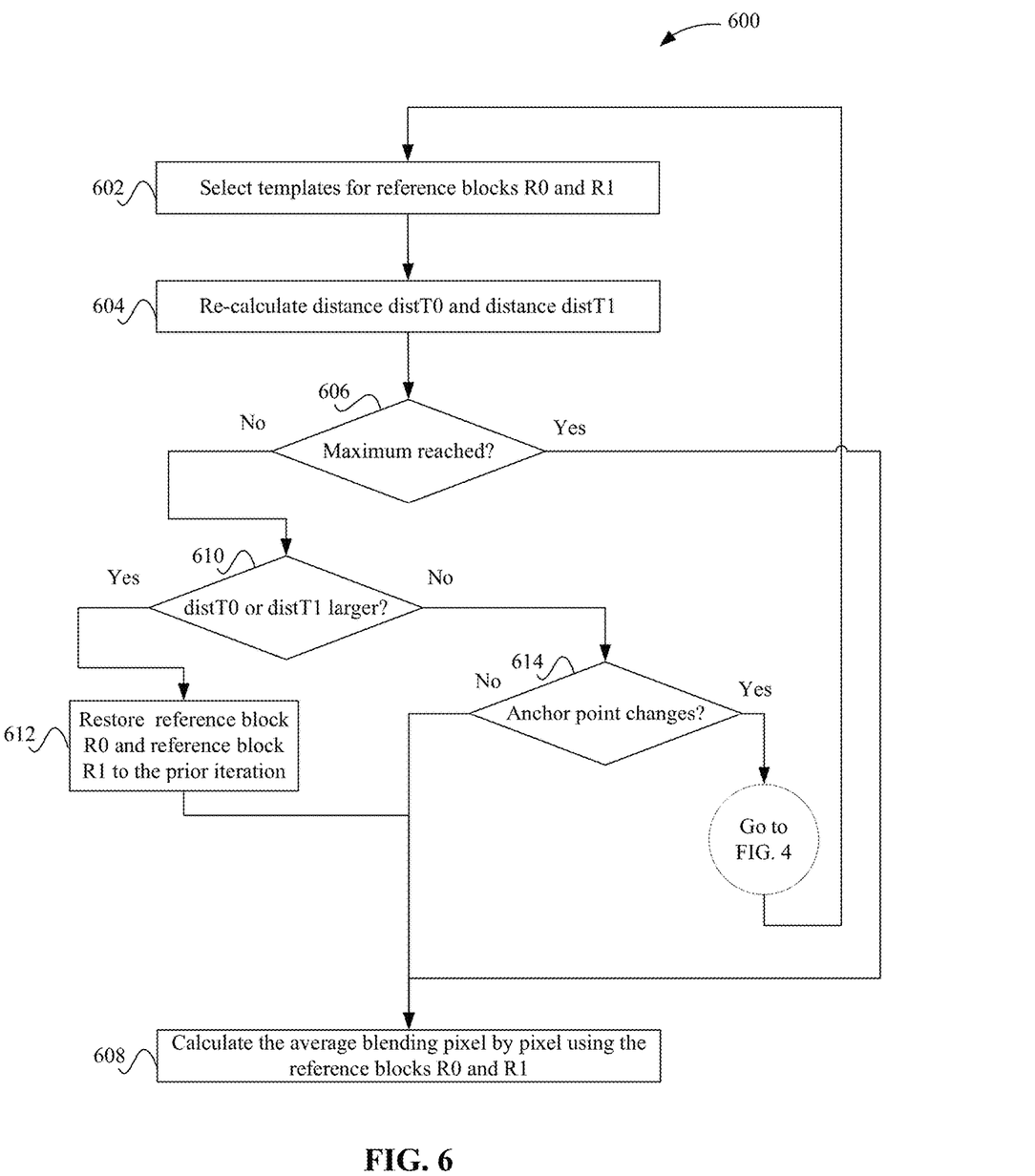
FIG. 6 depicts a simplified flowchart of a recalculation of the distances and anchor point using the new reference block R1 according to some embodiments.

The search process may not end at this point and may continue using the new reference block R2' as the selected reference block R1. FIG. 6 depicts a simplified flowchart of a recalculation of the distances and anchor point using the new reference block R1 according to some embodiments. Transcoder 106 or decoder 112 uses the same procedure as described above to select templates. For example, transcoder 106 or decoder 112 selects reference frame 0 and reference frame 1, which are the same in this case. Then, transcoder 106 or decoder 112 uses motion vectors to select the positions of the reference blocks R0 and R1. The motion vector for reference block R1 may have changed because decoder 112 selected a new reference block R1. Then, at 602, transcoder 106 or decoder 112 then selects templates for reference blocks R0 and R1. Once selecting the templates, at 604, transcoder 106 or decoder 112 re-calculates distance distT0 and distance distT1. For example, transcoder 106 or decoder 112 recalculates the distance distT0 between the template 306-1 of reference block R0 and the template 302 of the current block. Also, transcoder 106 or decoder 112 recalculates the distance distT1 between the template 306-2 of new reference block R1 and the template 302 of the current block. Transcoder 106 or decoder 112 then selects a new anchor point based on the distances.

At 606, transcoder 106 or decoder 112 determines if an iteration count has reached a maximum. The iteration count limit may be used to save the processing time because the refinement may be converging to the acceptable range and further iteration may not bring additional benefits. If the iteration count is reached, at 610, the search ends and transcoder 106 or decoder 112 calculates the average blending pixel by pixel as described above to create a prediction block. At 608, transcoder 106 or decoder 112 determined if the distance dist0 or the distance dist1 is larger than the prior iteration. If the distance is larger, then at 612, transcoder 106 or decoder 112 restores reference block R0 and reference block R1 to the prior iteration and the search process may end. Also, at 608, transcoder 106 or decoder 112 calculates the average blending pixel by pixel as described above. The process may end because the distance has gotten worse and the last iteration may be the best result from within region 502.

If distance dist0 or distance dist1 is not larger than the prior iteration, then at 612, transcoder 106 or decoder 112 determines if the anchor point changes to the other reference frame. If so, the process reiterates to perform the process described in FIG. 4. Transcoder 106 or decoder 112 uses the new anchor point and performs the search in a search region in the other reference frame. The process continues at 602 in FIG. 6 after the search for a new reference block. The use of a new anchor point may improve the reference block in the other reference frame. For instance, transcoder 106 or decoder 112 may find a new reference block R0' that is closer in distance to the current block. After finding another new reference block R0', transcoder 106 or decoder 112 may determine another iteration should be performed. Since both reference blocks have changed positions, the search region may change again, and transcoder 106 or decoder 112 may find another reference block that may be closer in distance to the current block.

If the anchor point does not change, at 608, transcoder 106 or decoder 112 calculates the average blending pixel by pixel. When the anchor point does not change, then the reference block in the other reference frame may be close to the optimal reference block. That is, there may not be another reference block in the search region that is better.

Accordingly, when transcoder 106 or decoder 112 replaces one or more of the reference blocks, the prediction block may provide a better prediction for the current block. The better prediction may enhance the encoder side motion prediction using the resources used by transcoder 106 or decoder 112 to find the one or more reference blocks.

System

Figure 7:
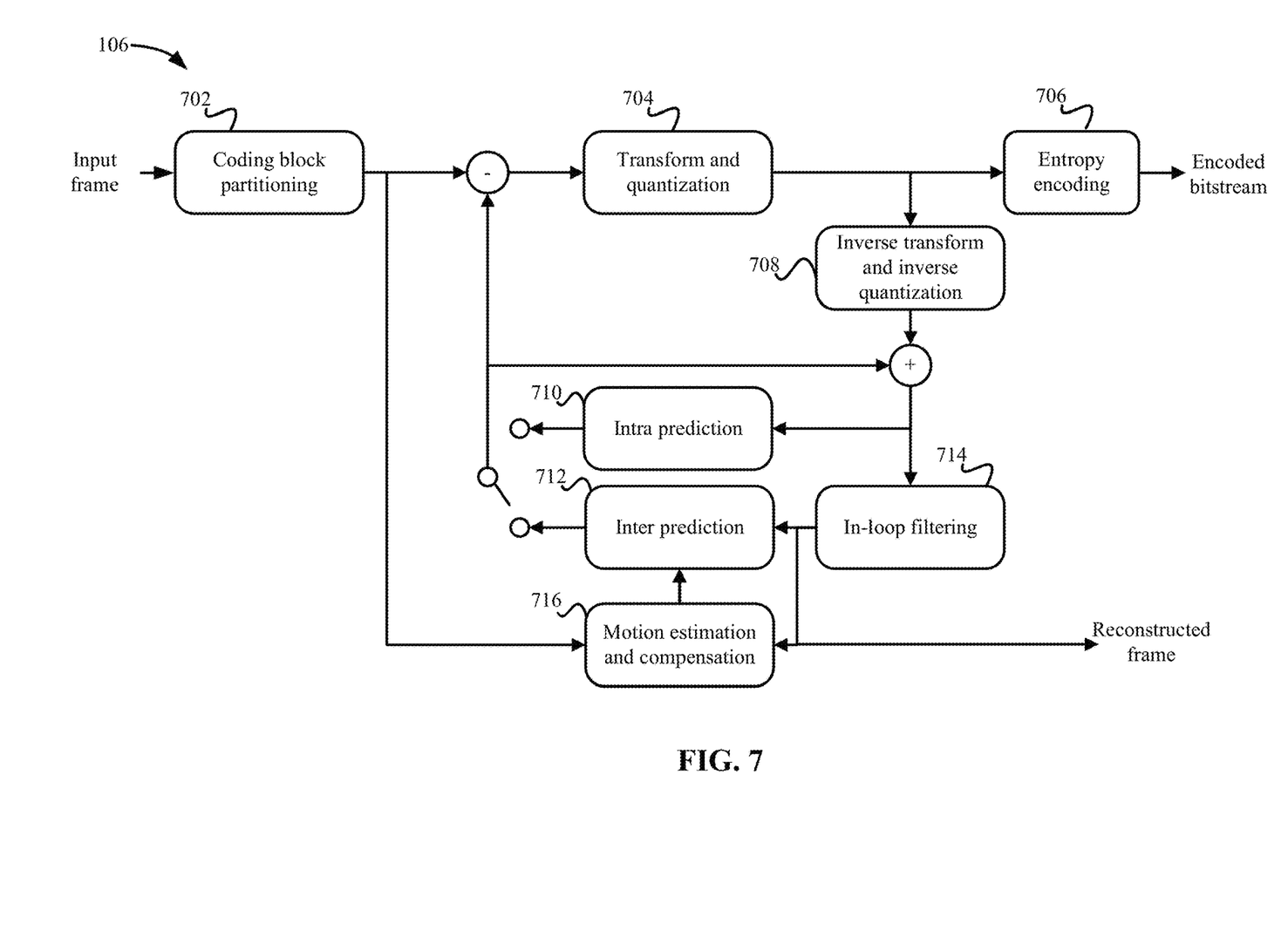
FIG. 7 depicts an example of a transcoding system according to some embodiments.

FIG. 7 depicts an example of a transcoding system according to some embodiments. A video codec framework includes a set of fundamental components: block partitioning, inter and intra prediction, transform and quantization, and entropy coding.

Transcoder 306 receives a frame of a video, which is firstly split into non-overlapping coding blocks for further processing. To cope with different video content characteristics, complex regions will be covered by partitions with smaller sizes, while simple regions will be covered by larger partitions. Multiple block patterns and shapes are may be both used together, for example quad-tree pattern, triple-tree pattern and binary-tree pattern can be all used together, while square blocks and rectangular blocks can also be used together.

Prediction is used to remove the redundancy of a video signal. By subtracting the predicted pixel values from the pixels being processed, the amplitude of a residual signal can be significantly reduced, thus the resulting bitstream size can be reduced. An intra prediction block 710, which is using reference pixels in the current frame, aims to reduce the spatial redundancy within the frame. An inter prediction block 712, which is using reference pixels from neighboring frames, attempts to remove the temporal redundancy between frames. a motion estimation and compensation block 716 may be a sub-module of inter prediction at the transcoder side, which captures the motion trace of objects among adjacent frames and generates reference pixels for inter prediction.

A transform and quantization block 704 uses the residual pixels after intra or inter prediction. Transform and quantization block 704 performs a transform operation that represents the residual signal in a frequency domain. Considering the human visual system is more sensitive on low frequency components of video signal than the high frequency components, quantization is designed to further compress the residual signal by reducing the precision on high frequency signals.

To avoid the out-of-sync issue between transcoder 306 and decoder 312, transcoder 306 contains decoding modules to make sure both transcoder 306 and decoder 112 are using identical mathematical processes. Thus, an inverse transform and inverse quantization block 708 is similar to the same block on the decoder side. Inverse transform and inverse quantization block 708 reconstructs pixels using the intra and inter prediction.

An in-loop filter 714 removes any visual artifacts that are introduced by the above-mentioned processes. Various filtering methods are applied on the reconstructed frame in a cascaded way to reduce different artifacts, including but not limited to the blocking artifacts, mosquito artifacts, color banding effects, etc.

An entropy encoding block 706 may further compress the bitstream using a model-based method. Transcoder 306 transmits the resulting encoded bitstream to decoder 310 over a network or other types of medium.

Figure 8:
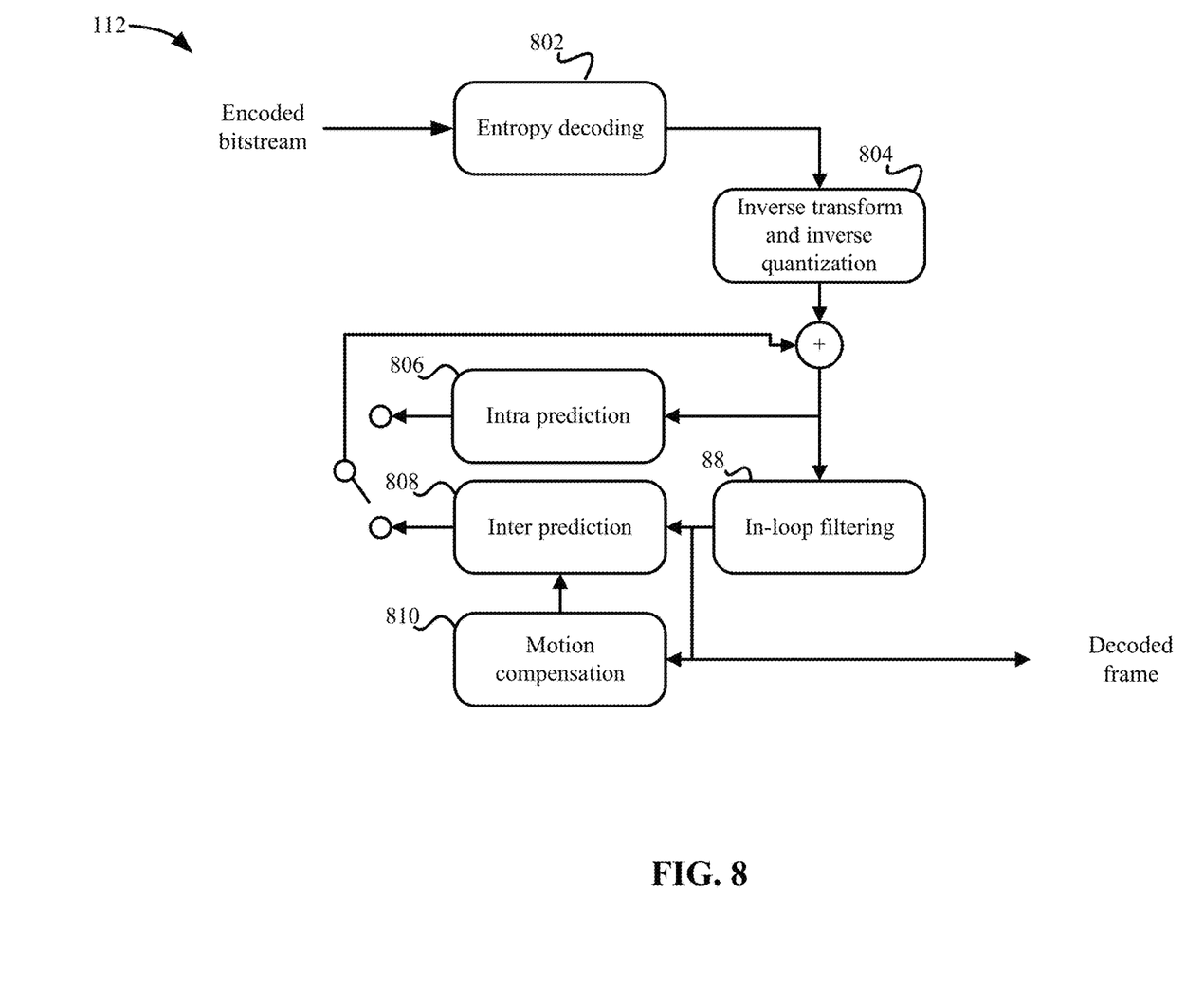
FIG. 8 depicts an example of a decoding system according to some embodiments.

FIG. 8 depicts an example of a decoding system according to some embodiments. Decoder 310 receives the encoded bitstream and inputs it into an entropy decoding block 802 to recover the information needed for decoding process. As above-mentioned, a decoded frame can be decoded by using an inverse transform and inverse quantization block 804, an intra prediction block 806 or inter prediction block 808, motion compensation block 810, and in-loop filtering block 812 in the same way to build a decoded frame.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method comprising:
   selecting, by a computing device, a first reference block in a first reference frame and a second reference block in a second reference frame, the first reference block and the second reference block being used to predict a current block;
   analyzing, by the computing device, first content in the first reference frame based on the first reference block and second content in the second reference frame based on the second reference block;
   selecting, by the computing device, one of the first reference block and the second reference block as an anchor point based on the analyzing, wherein having the anchor point as the one of the first reference block and the second reference block indicates a search for a third reference block in another of the first reference frame and the second reference frame should be performed;
   searching, by the computing device, in the one of the first reference frame and the second reference frame for a third reference block; and
   after selecting the third reference block, determining, by the computing device, whether the anchor point changes based on analyzing third content based on the third reference block and the first content or the second content based on the one of the first reference block and the second reference block.

2. The method of claim 1, wherein analyzing the first content in the first reference frame and the second content in the second reference frame comprises:
   calculating a first distance between a first template of the first reference block and a second template of the current block;
   calculating a second distance between a third template of the second reference block and the second template of the current block; and
   analyzing the first distance and the second distance to select the first reference block as the anchor point.

3. The method of claim 2, wherein the first distance and the second distance are generated by comparing a characteristic between the first template and the second template and between the third template and the second template, respectively.

4. The method of claim 3, wherein in the one of the first reference frame and the second reference frame for the third reference block comprises:
   calculating distances between other reference blocks in a search area in the one of the first reference frame and the second reference frame; and
   selecting the second distance as a minimum distance among the other distances to select the third reference block.

5. The method of claim 1, wherein a characteristic of the third reference block is more similar to the characteristic of the first reference block than the characteristic of the second reference block to the first reference block.

6. The method of claim 1, further comprising:
   using the third reference block instead of the second reference block to predict the current block.

7. The method of claim 1, further comprising:
   receiving a flag that is set to a value to indicate the current block uses a template refined bi-prediction process that is used to search for and select the third reference block.

8. The method of claim 1, further comprising:
   transcoding the current block using the third reference block instead of the second reference block.

9. The method of claim 1, further comprising:
   decoding the current block using the third reference block instead of the second reference block.

10. The method of claim 1, further comprising:
    determining that the third reference block is a better reference block than the second reference block;
    determining whether the third reference block in the one of the first reference frame and the second reference frame is a new anchor point;
    when the third reference block in the one of the first reference frame and the second reference frame is the new anchor point:
    searching in the other of the first reference frame and the second reference frame for a fourth reference block; and
    determining whether the fourth reference block is a better reference block than the first reference block for predicting the current block.

11. The method of claim 10, further comprising:
    determining that the fourth reference block is the better reference block; and
    calculating a prediction block using the fourth reference block and the third reference block.

12. The method of claim 10, further comprising:
    when the third reference block in the second reference frame is not the new anchor point, calculating a prediction block using the first reference block and the third reference block.

13. The method of claim 10, further comprising:
    determining that the first reference block is the better reference block; and
    calculating a prediction block using the first reference block and the third reference block.

14. The method of claim 1, further comprising:
    calculating a prediction block using the first reference block and the third reference block.

15. The method of claim 1, further comprising:
    blending pixels of the first reference block and the third reference block to generate a prediction block.

16. The method of claim 10, further comprising:
    determining that the second reference block is a better reference block than the third reference block; and
    calculating a prediction block using the first reference block and the second reference block.

17. A non-transitory computer-readable storage medium containing instructions, that when executed, control a computer system to be operable for:
    selecting a first reference block in a first reference frame and a second reference block in a second reference frame, the first reference block and the second reference block being used to predict a current block;
    analyzing first content in the first reference frame based on the first reference block and second content in the second reference frame based on the second reference block;
    selecting one of the first reference block and the second reference block as an anchor point based on the analyzing, wherein having the anchor point as the one of the first reference block and the second reference block indicates a search for a third reference block in another of the first reference frame and the second reference frame should be performed;

searching in the one of the first reference frame and the second reference frame for a third reference block; and after selecting the third reference block, determining whether the anchor point changes based on analyzing third content based on the third reference block and the first content or second content based on the one of the first reference block and the second reference block.

18. The non-transitory computer-readable storage medium of claim 17, wherein analyzing the first content in the first reference frame and the second content in the second reference frame comprises:

calculating a first distance between a first template of the first reference block and a second template of the current block;

calculating a second distance between a third template of the second reference block and the second template of the current block; and analyzing the first distance and the second distance to select the first reference block as the anchor point.

19. The non-transitory computer-readable storage medium of claim 17, further operable for:

using the third reference block instead of the second reference block to predict the current block.

20. An apparatus comprising:

one or more computer processors; and a non-transitory computer-readable storage medium comprising instructions, that when executed, control the one or more computer processors to be operable for:

selecting a first reference block in a first reference frame and a second reference block in a second reference frame, the first reference block and the second reference block being used to predict a current block;

analyzing first content in the first reference frame based on the first reference block and second content in the second reference frame based on the second reference block;

selecting one of the first reference block and the second reference block as an anchor point based on the analyzing, wherein having the anchor point as the one of the first reference block and the second reference block indicates a search for a third reference block in another of the first reference frame and the second reference frame should be performed;

searching in the one of the first reference frame and the second reference frame for a third reference block; and after selecting the third reference block, determining whether the anchor point changes based on analyzing third content based on the third reference block and the first content or second content based on the one of the first reference block and the second reference block.

* * * * *